(12) United States Patent
Ferber

(10) Patent No.: US 7,184,971 B1
(45) Date of Patent: Feb. 27, 2007

(54) METHOD AND APPARATUS FOR AN E-MAIL AFFILIATE PROGRAM

(75) Inventor: John B. Ferber, Baltimore, MD (US)

(73) Assignee: Advertising.com, Baltimore, MD (US)

( * ) Notice: Subject to any disclaimer, the term of this patent is extended or adjusted under 35 U.S.C. 154(b) by 608 days.

(21) Appl. No.: 09/716,563

(22) Filed: Nov. 20, 2000

Related U.S. Application Data

(60) Provisional application No. 60/166,690, filed on Nov. 20, 1999.

(51) Int. Cl.
*G06Q 30/00* (2006.01)
(52) U.S. Cl. ........................................ 705/14
(58) Field of Classification Search ................. 705/14
See application file for complete search history.

(56) References Cited

U.S. PATENT DOCUMENTS

| | | | | |
|---|---|---|---|---|
| 5,721,827 | A * | 2/1998 | Logan et al. | 709/217 |
| 5,740,549 | A * | 4/1998 | Reilly et al. | 705/14 |
| 5,848,396 | A | 12/1998 | Gerace | |
| 5,937,392 | A | 8/1999 | Alberts | |
| 6,029,141 | A * | 2/2000 | Bezos et al. | 705/27 |
| 6,663,105 | B1 * | 12/2003 | Sullivan et al. | 273/138.2 |

FOREIGN PATENT DOCUMENTS

| | | |
|---|---|---|
| WO | WO 98/58334 | 12/1998 |
| WO | WO 00/62879 * | 10/2000 |

OTHER PUBLICATIONS

Definition of "e-mail" (n), Microsoft Press Computer Dictionary, 3rd ed. (Redmond WA: Microsoft Press, 1997).*
Negus, Beth, "Winning new subscribers", Direct, v. 10 n. 14, p. 139 (Oct. 15, 1998).*
"Relationship E-Mail Marketing vs. Spam"; Dr. Ralph F. Wilson, Web Marketing Today Issue 59, Aug. 1, 1999.
Kohda, Youji et al., "Ubiquitous Advertising on the WWW: Merging Advertisement on the Browser", Computer Networks and ISDN Systems, vol. 28 (1996) pp. 1493-1499.

* cited by examiner

*Primary Examiner*—Donald L. Champagne
(74) *Attorney, Agent, or Firm*—Finnegan, Henderson, Farabow, Garrett & Dunner, L.L.P.

(57) ABSTRACT

The present invention makes it easy to collect, manage, and communicate with consumers using e-mail and other forms of push-based messaging as the primary vehicle for communication of marketing content. The software makes it simple to offer bounties or other types of compensation to any participant interested in referring new users to into the system as well as offer a multiple tier referral system so that those participants can refer others as well. The present invention: makes it possible to track the entire path of a communication and all of the actions inside of it for modeling and other analytical purposes; simplifies the process for generating custom marketing communications in large capacity; simplifies the process of enabling the selection, insertion and delivery of marketing communications inside of the main communication layer and enables an administrator to easily administer all aspects of the software from an intuitive web based interface.

15 Claims, 2 Drawing Sheets

METHOD AND APPARATUS FOR AN E-MAIL AFFILIATE PROGRAM

RELATED APPLICATIONS

This application claims the benefit of U.S. Provisional Application No. 60/166,690, titled "E-mail Affiliate Program and Process," filed Nov. 20, 1999.

FIELD OF THE INVENTION

This invention is drawn to an e-mail affiliate program and process for marketing purposes. It includes software for the implementation of a system to produce e-mail marketing lists. A preferred embodiment for these lists is to supply subscribers for Internet publications commonly known as "ezines".

BACKGROUND OF THE INVENTION

In recent years, the exponential growth of the network of computer networks known as the Internet has also lead to enormous growth in the area of "on-line" advertising. One popular channel of on-line advertising has been e-mail.

Typically, entities have collected e-mail addresses from various sources, such as by manually collecting or using spiders or bots to collect e-mail addresses from news groups or auction sites on the Internet. They then broadcast or "spam" an identical, unsolicited marketing message to their collected list. Needless to say, these unsolicited messages annoy most recipients and result in very low response rates. Additionally, many recipients regard the "spam" as an invasion of their privacy. What is needed is a system that sends marketing messages only to those who "opt-in" and increases both the number of participants and/or the number of responses by offering incentives.

BRIEF SUMMARY OF THE INVENTION

The present invention is drawn to software that allows an enterprise to offer cash, prizes, or incentives to webmasters or consumers in exchange for their assistance in (i) accumulating subscribers or e-mail addresses and/or (ii) getting subscribers to view advertisements or to refer associates to the program.

The subscribers (typically subscribed via their e-mail address) may subscribe for content-based subscriptions/newsletters/alerts, marketing message only-based subscriptions/mailings, and incentive-based subscriptions where the subscriber may receive incentives, such as payment in cash, program points toward prizes, discounts on products or opportunities to win sweepstakes, in exchange for responding to future e-mails and other marketing messages or content delivered through internet-enabled channels.

The present invention includes:
a) a sign-up means that allows webmasters or consumers to enter their information, including e-mail address, and the right to market to it, online through a web browser so that they can participate into the program;
b) a set of instructions and computer coding into which the webmaster or participant must use as a method of which to promote the program, including prompting the user for an action, like entering information or clicking somewhere, before they are eligible;
c) a statistical interface which provides the webmaster or participant with a way to see how many subscribers and/or referrals they have generated and or what revenue/prizes/incentives they have accumulated to date (either instantly directly after the transaction, or at any time as a cumulative sum of all chance possibilities that have occurred in the past); and
d) a software application which allows an administrator of the program to
   1) view accounts of participants,
   2) view number of participants,
   3) edit information on participants,
   4) keep track of subscriber and webmaster referral information, and
   5) send e-mails to the subscribers and/or the participants.

The software allows a consumer to sign-up to subscribe for delivery of information or content such as ezines, newsletters, alerts or marketing messages with each such delivery to be sent to the subscriber's e-mail address. Consumers may subscribe for more than one offering (i.e., co-registration).

The e-mail delivery system of the present invention includes a system that consists of software and hardware allowing the owner of a mailing list the ability to e-mail out marketing messages to their subscribers and enable them to track the responses of those messages.

Tracking of responses includes:
a) whether the subscriber received the e-mail, opened the e-mail, read the e-mail, how long they read the e-mail, did they perform any action inside of the e-mail such as fill in information, click on a hyperlink;
b) the geographic location of the subscriber(s), area code, domain name, ISP, sex, marital status, occupation, etc. . . . this reporting can be in the form of individually reported data or group reported data;
c) the ability to track subscribers over time in regards to all of the e-mails they have received, the ads they have received, the ads they have responded to, characteristics about that subscriber, including, but not limited to, observed behavior, demograhic and pyschographic data that is available on the subscriber;
d) the ability to track on a timeline when any of the actions, such as opening, clicking, etc., occurred for the population sample mailed to; and
e) the ability to send different messages to sample groups with the same info, decision which message is most effective, and send more of the better-performing message to the rest of the population with the same or similar demographics/details.

It is an object of the present invention to provide software that allows an enterprise to offer cash, prizes, or incentives to webmasters or consumers in exchange for their assistance in (i) accumulating subscribers or e-mail addresses and/or (ii) getting subscribers to view advertisements or to refer associates to the program.

It is an object of the invention to provide the ability to reliably deliver marketing messages to millions of recipients on a periodic or demand basis.

It is a further object of the invention to store e-mail marketing information directly in a database instead of flat files or other file formats.

It is another object of the invention to import existing participant e-mail marketing information from flat files or other file formats into a new database.

It is another object of the invention to keep e-mail marketing statistics about each e-mail subscriber, including: lists subscribed (including start and end date), total number of e-mails sent to this subscriber, which ads e-mailed to this subscriber, and which ads clicked by this subscriber.

It is yet another object of the invention to keep statistics about each referring participant in an e-mail marketing program, including the number of subscribers referred and the referring (multi-level) participant.

It is an object of the invention to provide the ability for e-mail marketing list creator to submit each issue's content via a web interface.

It is an object of the invention to provide the ability for e-mail marketing recipients to subscribe or unsubscribe to one or more lists via e-mail via an internet, with web-based confirmation.

It is another object of the invention to provide the ability to launch list distribution for e-mail marketing via a web-based interface for one or more mailing lists, allowing administrators to specify a time to automatically launch the distribution.

It is an object of the invention to provide the ability for participants to sign-up for an e-mail marketing program via a web-based interface, and indicate a referring webmaster or subscriber.

It is an object of the invention to provide the ability for participants in an e-mail marketing program to check their statistics via a web-based interface.

It is another object of the invention to allow subscribers to modify their sign-up profile, including the list of information or content they want to receive.

It is another object of the invention to provide the ability to monitor the performance of the content delivery in an e-mail marketing system, including status of particular content (current status, % of content delivered, time started/stopped, etc), system throughput (number of recipients per each piece of content delivered, per day, bounced e-mails, etc.), subscription/unsubscription per day per particular content, and bandwidth usage.

It is another object of the invention to remove bogus/undeliverable addresses in an e-mail marketing system.

It is another object of the invention to provide an e-mail marketing program with real-time or batch subscribe and delete facilities via a web or an e-mail interface.

It is an object of the invention to provide the ability to show ads on "public" web interfaces to the content delivery system in an e-mail marketing program (i.e., when subscribers confirm their subscription, show an ad on that page).

It is an object of the invention to provide documentation on how each component of an e-mail marketing system works.

It is an object of the invention to provide the ability to test an e-mail marketing system.

It is an object of the invention to provide a web or an e-mail interface to allow e-mail marketing subscribers to retrieve ezine back issues with new ads.

It is an object of the invention to provide personalized content and ads for individual recipients, specifically selecting content based upon attributes in a subscriber database (e.g., gender, age, chosen topics, etc.).

It is an object of the invention to provide an HTML sniffer to determine if a given e-mail marketing subscriber can receive HTML e-mail.

It is an object of the invention to provide the ability to add/edit/modify ads stored in a database via web interface.

It is an object of the invention to provide the ability to detect fraud in an e-mail marketing program.

It is an object of the invention to provide the ability to monitor e-mail marketing system CPU/memory/disk/throughput usage on an hourly/daily/monthly or other assessment period basis.

It is an object of the invention to provide the ability to gather info about qmail usage via qmailanalog package.

It is an object of the invention to integrate ad responses in an e-mail marketing system with an advertising server, including the ability to track which ads a subscriber responded to.

It is an object of the invention to provide the ability to send cookies to subscribers when they confirm their subscription to an e-mail marketing program and link these up with advertiser server cookies.

It is an object of the invention to provide the ability to construct new (temporary) "sub-lists" from any set of e-mail marketing subscribers in the database via a web interface.

It is an object of the invention to provide the ability for content creators to automatically include ads in an issue without manually inserting lengthy code.

It is an object of the invention to keep e-mail marketing statistics about each ad e-mailed, including total times each ad e-mailed, how many times each ad e-mailed per ezine, total times each ad responded to, and total unique responses for each ad.

DETAILED DESCRIPTION OF THE INVENTION

Figure 1:
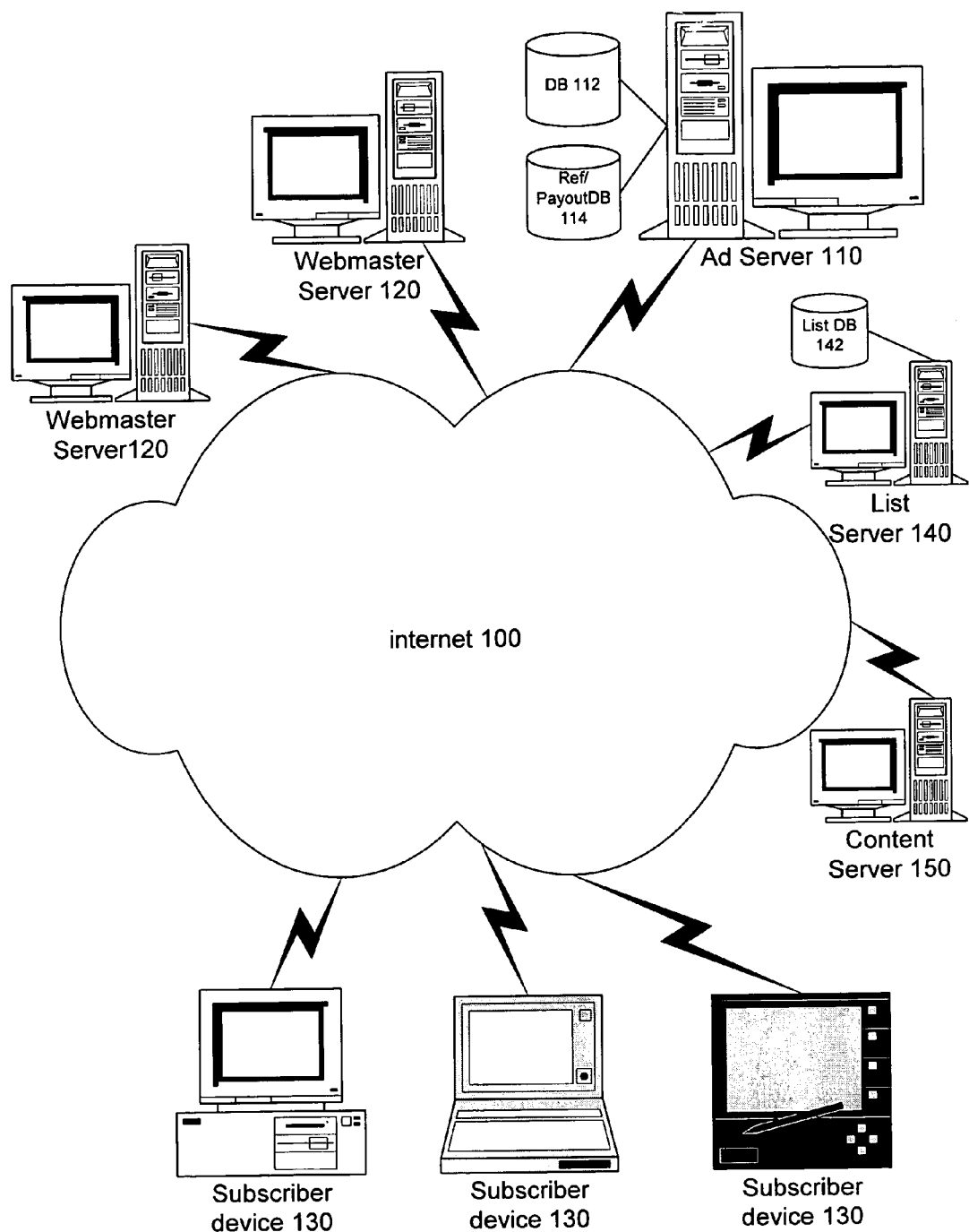
FIG. 1 illustrates a basic network architecture for practicing the present invention.

As used herein, the term "webmaster" refers to any entity, including an individual or publisher, who uses a website to deliver or generate new subscribers to a product or service. A "participant" refers to any user of the present invention, including a webmaster or a subscriber.

The term "click(s)" refers to any measurable response from a consumer, including, but not limited to, selection by a mouse, rollerball, pointer, stylus, jog-dial, or any other user-selection device, and/or conversions or sales resulting therefrom. The term "internet" refers to any network of networks, whether wired or wireless, including WANs and global networks such as the ARPAnet-derived network commonly referred to as the Internet and the high-bandwidth Internet2.

The terms "ad(s)" and "advertisement(s)" refer to any creative or content produced, at least in part, for advertising purposes such as branding or the promotion of products or services. The term "e-mail" refers to any messaging to a specific entity over an internet to an internet-enabled device, including, but not limited to, both ordinary SMTP-based POP3 and IMAP e-mail, instant messaging (IM), and short messaging service (SMS). The term "e-mail address" refers to any identifier of a participant that allows for delivery of messages and/or content to the participant's internet-enabled device, including, but not limited to, standard "name@domain.tld" e-mail addresses, IP addresses, and phone numbers.

The following is a rough schema of the tables required by an ezine database of the preferred embodiment. Although described below with reference to an ezine, the system is equally suited for delivery of any information or content requested by subscribers to any internet-enabled device, including, but not limited to, newsletters, marketing messages, alerts and other subscriber requested content.

The "basic" tables describe individual entities in the ezine system: users (subscribers and webmasters), ads, and the different ezines themselves. These tables do not rely on information from other tables, and so have unique primary (i.e., not composite) keys.

Confirmation Table

Each row of this table describes one subscriber's confirmation information. Each row need only persist until a subscriber has confirmed their subscription, and can then be deleted.

Columns:
- email (primary key) // required, varchar(80), references email field in user table
- ezine_code_list // required, varchar(60), space-delimited list of ezines initially signed up for, ignored once they have confirmed their signup—look in ezine_subscriber table instead.
- referring_account_number // required, varchar(80), references account_number in webmaster table for initial signup (before confirmation). Ignored after subscriber confirms—look in ezine_subscriber table instead.

User Table

Each row of this table describes information common to any participant (either subscriber or webmaster)

Columns:

Info for all participants (webmasters or subscribers)
- email (primary key) // required, varchar(80)
- first_name // required, varchar(30)
- last_name // required, varchar(30)
- zip_code // required, char(10)
- country // required, varchar(30), range is list of provided countries
- signup_datetime // required, datetime, this is the time when the subscriber is mailed their initial signup letter
- IP_address // required, char(15)
- is_valid_email // required—is this a valid email address, char(1), Y|N
- admin_comments // optional, text, any comments that we want to add about this user. This is not information the user provides.
- is_active // optional, char(1), Y|N is this user "active," i.e., can they receive ezines and be paid
- last_modified_timestamp // timestamp, not null
- num_bounced_deliveries // int, number of delivery attempts to this user which have bounced Subscriber Table Each row of this table describes one subscriber.

Columns:
- email (foreign key) // required, varchar(80), references email field in user table
- confirmation_string // required for S, char(64), md5 (email)+ datetime + process ID
- cookie_info // required for S, varchar(100)
- is_HTML_reader // required, char(1), Y|N—can this subscriber receive HTML-ified ezines All these are optional info for subscribers. Different ones will be displayed to different subscribers when they sign up, based on the referring webmaster.

- gender // char(6), Male or Female
- age // char(10), ranges: <13,13–17,18–21,22–24,25–29, 30–35,36–40,41–49,50–59,60–65,65+
- education_level // varchar(40), ranges: "some high school," "high school graduate," "some college," "vocational/technical training," "college graduate," "graduate school," "doctorate"
- marital_status // char(7), range is married|single
- num_children // char(2), range is 0, 1, 2, 3, 4, 5+
- occupation // varchar(40), range: "professional," "administrative/clerical," "management," "designer/artist," "Internet professional," "educator," "marketing/sales," "engineer," "writer," "homemaker," "military service," "consultant," "legal field," "student," "retired," "other"
- income // varchar(10), range: <25K, 25–49K, 50–74K, 75–99K, 100–149K, 150–199K, 200K+
- primary_computer_use // char(40), range is "home," "business," "home office," "school," "government facility"
- interests // text, range is a comma-delimited list of items that appear as checkboxes on the signup page: sports, travel, entertainment/humor, dining, investments, gaming, computing, autos, men's issues, women's issues, health issues, trivia, astrology
- items_purchased // varchar(255), any items the subscriber has purchased on the net
- like_to_purchase // varchar(255), any items the subscriber would like to purchase on the net
- plan_to_purchase // varchar(40), any items the subscriber is planning to purchase in the next year, range: "vehicle," "boat," "house," "computer equipment," "vacation package," "stereo equipment," "VCR"
- net_access_frequency // varchar(40), "every day," "once or twice a week," "two or three times a month," "once a month or less"
- wants to receive email // char(1), Y|N—does this subscriber want to receive email about items of interest
- last_modified timestamp // timestamp, not null
- email_md5 // varchar(64), not null, this is the md5 hash value of the email address Webmaster Table Each row of this table describes one webmaster.

Columns:
- email (foreign key) // required, varchar(80), references email field in user table
- account_name // required, varchar(25), must be >=6 chars
- account_number (primary key, auto_increment) // required, integer
- password // required, varchar(25), must be >=6 chars
- address_line_1 // required, varchar(30)
- address_line_2 // optional, varchar(30)
- city // required, varchar(25)
- state // required, char(2), range is a list of state abbreviations, or N/A to indicate outside the US
- phone_number // required, varchar(20)
- payee_on_check // required, varchar(50)
- minimum_check value // required, decimal(7,2)
- tax_ID_or_SSN // required, varchar(20)
- referral_rate // required—for user referrals, decimal(4,2), default "0.10"
- second_tier rate // required—for second-tier referrals, decimal(4,2), default "0.04"

referring_account_number // optional, varchar(80), the user who referred this one, references account_number field in webmaster table referring_URL // optional, varchar(80), website through which this webmaster was referred last_modified timestamp // timestamp, not null

Sign-Up Field Table

Each row of this table describes one possible field of data we want to collect for users.

Columns:
  field_name (primary key)// required, varchar(30), should exactly match one of the optional subscriber fields in the user table
  display_name // required—what the user sees on the web page, varchar(255)
  data_type // required, varchar(12), range is INT, STRING, DATE, etc.
  HTML_input_type // required—type of control to show for this field on web page, varchar(12), range is checkbox, textfield, text, radio button, etc.
  value_range // optional, text, comma-delimited range if provided, else free-form text if not provided

Ezine Description Table

Each row of this table describes one ezine.

Columns:
  ezine_code (primary key) // required, char(2), two-character ezine code
  ezine_name // required, varchar(30), ezine name
  ezine_URL // required, varchar(80), ezine location
  short_description // required, varchar(80), description in a few words
  long_description // required, varchar(255), several sentence description
  thank_you_text // required, varchar(255), for signup
  is_active // required, char(1), Y|N—is this an active ezine
  creation_datetime // datetime, when this ezine was created

Ad Table

Each row of this table describes one ad that can be inserted into an ezine issue Columns:
  banner_id (primary key) // required, varchar(30)
  banner_text // required, TEXT
  banner_URL // required, varchar(80)
  num_clicks // required, BIGINT DEFAULT 0
  num_impressions // required, BIGINT DEFAULT 0
  is_active // required, char(1)
  entry_datetime // required, datetime

Advertiser Table

Each row of this table describes one advertiser

Columns:
  system_account (primary key) // varchar (50) not null
  advertiser_name (unique) // varchar (50), not null

Ad Campaign Table

Each row of this table describes one advertiser campaign

Columns:
  campaign_id (primary key) // varchar(30) not null
  system_account (unique) // varchar (50) not null, references system_account in advertiser table
  banner_id // varchar(30) not null, references banner_id in ads table
  num_clicks // bigint default 0
  num_impressions // bigint default 0
  start_datetime // datetime
  end_datetime // datetime
  comments // text
  gross_payment // decimal(5,2)
  percent_done // int(3)
  target_percent // int(3)
  unit_difference // bigint
  effective_CPM // bigint The following tables are derived from information in the basic tables above. They also contain some information unique to themselves. Note that these tables could have duplicate ID keys, but will have unique composite keys.

Website Table

Each row of this table describes a webmaster and a website (since a webmaster might own several different sites).

Columns:
  site_URL (primary key) // required, varchar(80)
  site_name // required, varchar(80)
  site_description // required, varchar(255)
  account_number (foreign key) // required, varchar(80), references account_number field in webmaster table

Website Sign-Up Field Table

Each row of this table describes a sign-up field to be displayed to new subscribers when they are referred by the specified website.

Columns:
  site_URL (foreign key) // required, varchar(80), references site_URL field in website table
  field_name (foreign key) // required, varchar(30), references field_name in signup field table
  is_required // required—is this subscriber required to fill in this field when they signup from this site, char(1), Y|N

Website Hosted Ezines Table

Each row of this table describes one ezine that can be hosted by a given website when the website is being used by a webmaster to generate subscriptions.

Columns:
  ezine_code (foreign key) // required, char(2), references ezine_code in ezine table;
  site_URL (foreign key) // required, varchar(80), references site_URL in signup field table

User Payout Table

Each row is the payout for a given participant on a given date if the participant is to be paid for the subscription.

Columns:
  account_number (foreign_key) // required, varchar(80), references account_number in webmaster table
  amount_paid // decimal(14,5), not null
  date_paid // required, date, when paid

Ezine Subscribers Table

Each row of this table describes one subscriber to a given ezine

Columns:
  email (foreign key) // required, varchar(80), references email in user table
  ezine_code (foreign key) // required, char(2), references ezine_code in ezine table
  signup_datetime // required, datetime, when user signed up to receive this ezine
  last_modified_timestamp // timestamp, this is the last time that the user modified their subscription to this ezine. Initially this is the same as signup_datetime.
  is_active // required, char(1), Y|N—is active recipient of this ezine
  referring_account_number // optional—the first (and only) user who referred this subscriber to this ezine, varchar(80), references account_number key in webmaster table
  referring_URL // optional, varchar(80), the website through which the user subscribed to the ezine

Ezine Issue Table

Each row of this table describes one mailing or issue of any ezine

Columns:
  issue_id (primary key) // required, varchar(30)
  ezine_code (foreign_key) // required, char(2), references ezine_code in ezine table
  last_modified_timestamp // required, timestamp
  req_start_datetime // datetime, when delivery of this issue was requested to begin
  actual_start_datetime // datetime, when delivery of this issue actually began
  end_queue_datetime // datetime, when this issue was fully queued
  end_delivery_datetime // datetime, when issue's delivery completed
  status // required, char (1), status of this issue's delivery D|S|P|I (disabled, sent, pending, in progress)
  num_recipients // bigint, not null

Ezine Ad Stats Table

Each row of this table describes one ad's impression and click statistics for a given ezine or individual mailing of an ezine.

Columns:
  banner_id (foreign key) // required, varchar(30), references banner_id in ad table
  num_clicks // required, bigint, how many times this ad has been clicked from this ezine
  position_in_ezine // required, int(3), position of ad in ezine
  issue_id (foreign_key) // required, varchar(30) references issue_id in ezine_issue table

Subscriber Click Stats Table

Each row of this table describes one ad that a subscriber has clicked on

Columns:
  email_md5 (foreign_key) // required, varchar(64), references email_md5 in subscriber table
  banner_id (foreign_key) // required, varchar(30), references banner_id in ad table
  issue_id (foreign_key) // required, varchar(30), references issue_id in ezine_issue table The following tables are for ezines administration purposes

Admin User Table

Columns:
  username varchar(80) not null
  password varchar(30) not null
  first_name varchar(30) not null
  last_name varchar(30) not null
  signup_datetime datetime not null
  IP_address varchar(15) not null
  ezine char(1) not null
  user char(1) not null
  internal char(1) not null
  stats char(1) not null
  content char(1) not null

Admin Login Log Table

Columns:
  username varchar(80) not null
  entry_datetime datetime not null
  IP_address varchar(15) not null

Admin Error Log Table

Columns:
  username varchar(80) not null
  entry_datetime datetime not null
  IP_address varchar(15) not null
  error_msg varchar(50) not null

Admin Activity Log Table

Columns:
  username varchar(80) not null
  entry_datetime datetime not null
  IP_address varchar(15) not null
  function varchar(30) not null The software of the invention also provides various web interface tools for the ezine system, including those used by ezine administrators, webmasters, subscribers, including:

Ezine Content Creation
  This allows a list creator/moderator to submit content for a list.

Distribution Administration
  Allows ezine administrator to indicate start time for distribution of one or more ezines. Also allows administrator to cancel one or more distributions in progress. Administrator should be able to add or remove subscribers or webmasters, as needed.

Stats Viewer
  Allows ad server personnel to view/extract database stats about ads, lists, webmasters, individual ezines, or subscribers.

Subscriber Sign-Up
  Allows subscribers to sign up for one or more ezines or other information they want. At this point, the user enters their e-mail address and selects the ezines or other information they want. A confirmation number is e-mailed to them, which they must use to confirm their sign-up. If possible, a cookie is put on their device at this point.

Subscriber Confirmation

This is where the user confirms their sign-up for the selected ezines. They are optionally required to fill out a survey. Once completed, they are added to the mailing list for the desired ezines or other information.

Subscriber Ezine Change

Allows subscribers to sign-up for new ezines or cancel subscription to ezines they're already receiving.

Webmaster Sign-Up

Allows webmasters to sign up, and indicate a referring (second-tier) webmaster. The webmaster is required to fill out a survey of information.

Webmaster Stats/Admin

Allows webmasters to view the stats for the number of subscribers and webmasters they've referred to the program (and the payout they'll receive). They can also change their account info and get the required HTML code to place on their webpages or get other information needed to refer subscribers.

Conversion Utility

Imports existing flat files into a database (i.e., MySQL or Oracle). These are a series of perl or other language scripts that process the various flat files, and write a handful of new flat files which contain the combined data. These new flat files can then be imported into the database via the LOAD or other command.

Bounce Remover

Removes undeliverable addresses from the database. To facilitate this, the present invention adds its own header to each e-mail sent: X-Sent-To: address@domain.com.

An example of the webmaster coding which can be provided as part of this invention is disclosed in the following JavaScript:

```
<script language="javascript">
function thankyou_ne( ) {
    var w =
window.open("","thankyou","scrollbars=yes,resizable=no,toolbar=no,
directories=no,status=no,menubar=no,locatian=no,screnX=200,
screenY=200,width=640,height=500");
    return true;
}
</script>
```

This is how the <form> tag is defined:

```
<form target="thankyou"
action="http://webserver1.teknosurf.com/cgi-bin/subscribe.cgi"
method="post" onsubmit="return (
(this.email.value.indexOf("@")>0 &&
this.email.value.indexOf(".")>0) ? thankyou_ne( ) :
(alert("Please enter a valid email address.") ||
false) )">
```

The following line is added to the form:

```
<input type="hidden" name="code_num" value="1">
```

In operating the present invention, it is preferable to use a webmaster's account_number instead of account_name in referring_account field. This requires changes to the import script. Also, if user logs in via account_name, the system can get the corresponding number and pass that along to the webmaster-*.cgi scripts.

FIG. 1 illustrates a basic network architecture for practicing the present invention, wherein an ad server 110 supplies the needed software to webmaster servers 120 and subscriber devices 130, either directly or indirectly (i.e., via another webmaster server or subscriber device which already has downloaded the software) over internet 100.

In a preferred embodiment, the ad server 110 provides both an ad server database 112 and a referral/payout database 114. The system also can include a separate list server 140, that maintains its own subscriber list database 142, and a separate content server 150.

Figure 2:
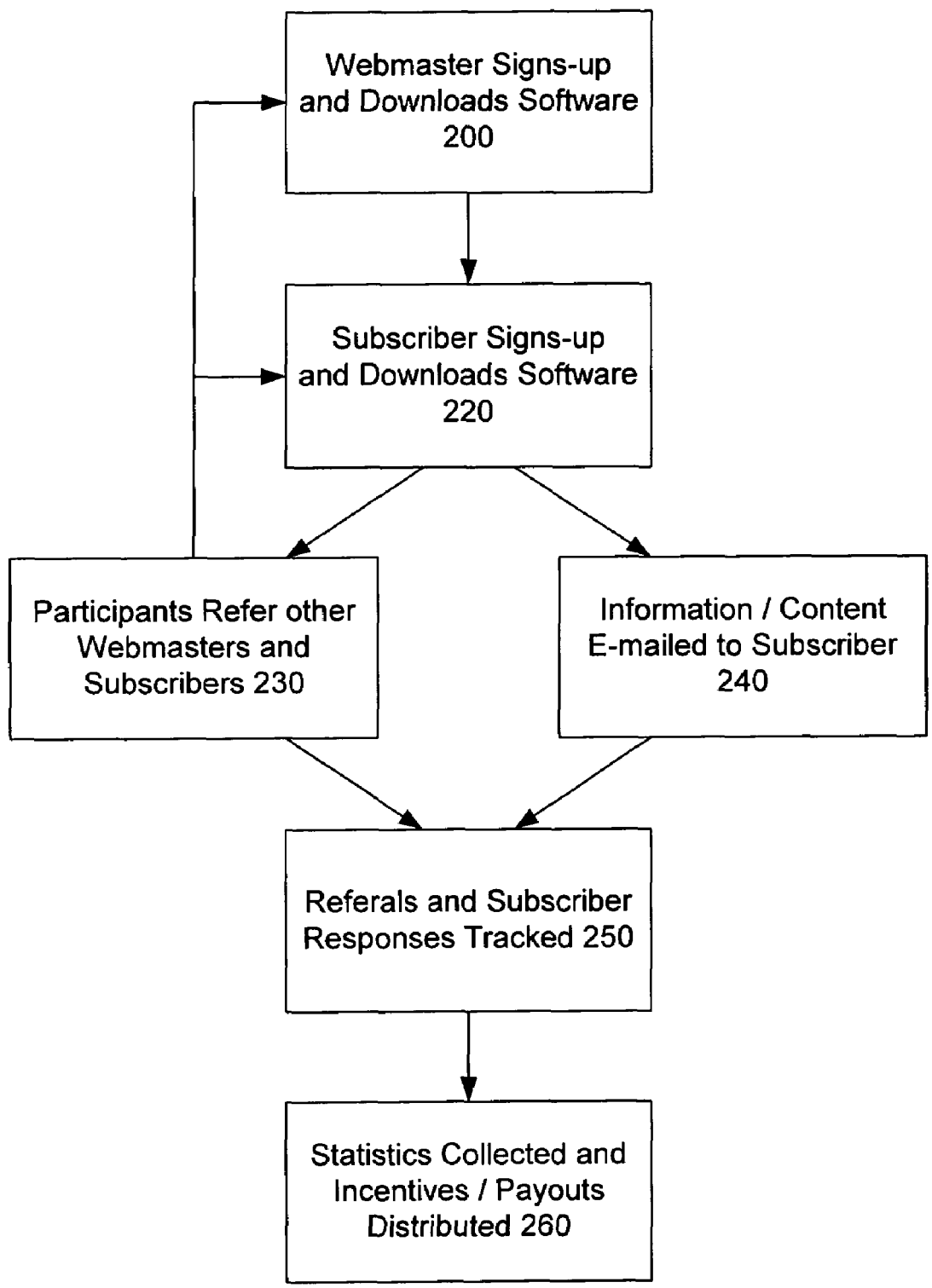
FIG. 2 illustrates a basic flow diagram for practicing the present invention.

FIG. 2 illustrates a basic flow diagram for practicing the present invention. An initial step 200 in the process is for webmasters to sign-up and download the software needed to practice the invention from an enabling entity such as an ad server. This sign-up can be done in any suitable manner, but is preferably accomplished through use of a web-based sign-up form or page, wherein the webmaster provides the input required for the user table and the webmaster table, as described above. This input can also include any referring webmaster information.

Consumers, likewise at 220, sign-up and download the software they need to practice the invention from an enabling entity such as an ad server or webmaster server. Again, this sign-up can be done in any suitable manner, but is preferably accomplished through use of a web-based sign-up form or page, wherein the consumer provides the input required for the confirmation table, user table, and subscriber table, as described above. This input can also include any referring webmaster or referring subscriber information.

As participants, the webmasters and subscribers have the necessary software/code to refer, at 230, other webmasters and subscribers and this information is tracked by the ad server, at 250.

The information or content that the subscriber has opted-in to receive is e-mailed to the subscriber at 240, and the subscriber responses are tracked at 250.

The information collected is then used for purposes such as to calculate incentives and payouts for the program participants, at 260. Additionally, the ad server can analyze the collected information by categories/fields, including but not limited to, website, ezine, ad campaign, ad, ad position, subscriber (including demographics, etc.), time, etc. to improve the effectiveness of the marketing response.

As disclosed above, the present invention makes it easy to collect, manage, and communicate with consumers using e-mail and other forms of push-based messaging as the primary vehicle for communication of marketing content. The present system makes it simple to offer bounties or other types of compensation to any participant interested in referring new users into the system as well as offer a multiple tier referral system so that those participants can refer others as well. The present invention makes it possible to track the entire path of a communication and all of the actions inside of it for modeling, reporting, auditing and other analytical purposes. The system also simplifies the process for generating custom marketing communications in large capacity. The present invention simplifies the process of enabling the selection, insertion and delivery of marketing communications inside of the main communication layer and enables an administrator to easily administer all aspects of the software from an intuitive web based interface. As disclosed, it enables the systems to run self-sufficient and be monitored for maximum performance. The present invention also enables the entire system to be scaleable.

I claim:

1. A method for e-mail-based opt-in marketing, comprising:
   providing an ad server connected to an internet;
   providing a database connected to said ad server;
   having at least one webmaster server connected to said internet;
   having at least one internet-enabled subscriber device connected to said internet;
   providing software instructions on each said webmaster server for collecting an e-mail address for said subscriber device and storing said e-mail address on said database by having an operator of said subscriber device input said e-mail address and make a selection to opt-in for delivery of an ezine from a plurality of available ezines to said e-mail address;
   providing software instructions on said ad server to facilitate delivery of said ezine to said subscriber device, wherein said ezine includes an ad; and
   providing compensation to said webmaster or a subscriber for referrals.

2. A system for e-mail-based opt-in marketing comprising:
   an ad server connected to an internet;
   a database connected to said ad server;
   at least one webmaster server connected to said internet;
   software instructions on each said webmaster server for collecting an e-mail address for said subscriber device and storing said e-mail address on said database by having an operator of said subscriber device input said e-mail address and make a selection to opt-in for delivery of an ezine from a plurality of available ezines to said e-mail address;
   software instructions on said ad server to facilitate delivery of said ezine to said subscriber device, wherein said ezine includes an ad; and
   means for providing compensation to said webmaster or a subscriber for referrals.

3. A method for encouraging consumers to participate in an e-mail marketing program, comprising:
   providing means for said consumer to opt-in to subscribe to receive an ad-containing ezine from a plurality of available ezines, at the consumer's e-mail address from said e-mail marketing program;
   providing software to said consumer to allow said consumer to refer other consumers to said e-mail marketing program as referrals;
   providing compensation to said consumer for any referrals; and
   providing incentives to said consumer for responding to ads in said ezine.

4. The method of claim 3, wherein said compensation is selected from the group consisting of currency, goods or services, discounts on goods or services, redeemable program points and prizes.

5. The method of claim 3, wherein said incentives are selected from the group consisting of sweepstakes entries, currency, goods or services, discounts on goods or services, redeemable program points and prizes.

6. A method for encouraging webmasters to participate in an e-mail marketing program, comprising:
   providing software to said webmaster to allow said webmaster to subscribe consumers to receive an ad-containing ezine from a plurality of available ezines, at their e-mail address from said e-mail marketing program;
   providing software to said webmaster to allow said webmaster to refer other webmasters to said e-mail marketing program as referrals;
   providing compensation to said webmaster for any referrals; and
   providing compensation to said webmaster for subscribing consumers to said e-mail marketing program.

7. The method of claim 6, wherein said compensation is selected from the group consisting of currency, goods or services, discounts on goods or services, redeemable program points and prizes.

8. The method of claim 1, further comprising providing software instructions on each said webmaster server or ad server to allow subscribers to retrieve ezine back issues with new ads.

9. The system of claim 2, further comprising software instructions on each said webmaster server or ad server to allow subscribers to retrieve ezine back issues with new ads.

10. The method of claim 3, further comprising providing software to said consumer to allow said consumer to retrieve ezine back issues with new ads.

11. The method of claim 6, further comprising providing software to said webmaster to allow said consumer to retrieve ezine back issues with new ads.

12. The method of claim 1, wherein said software instructions on said webmaster server has said operator make said selection to opt-in for delivery of said ezine when said operator inputs said e-mail address.

13. The system of claim 2, wherein said software instructions on said webmaster server has said operator make said selection to opt-in for delivery of said ezine when said operator inputs said e-mail address.

14. The method of claim 3, wherein said subscribing means has said consumer opt-in to subscribe to said ezine when said consumer inputs said consumer's e-mail address.

15. The method of claim 6, wherein said software to said webmaster subscribes said consumers to said ezine when said e-mail addresses are inputted.

* * * * *